(12) United States Patent
Xu (10) Patent No.: US 9,479,900 B2
(45) Date of Patent: Oct. 25, 2016

(54) GEOGRAPHIC LOCATION-BASED COMMUNICATIONS METHOD, MOBILE TERMINAL, SERVER, AND GEOGRAPHIC LOCATION-BASED COMMUNICATIONS SYSTEM

(71) Applicant: Tencent Technology (Shenzhen) Company Limited, Shenzhen (CN)

(72) Inventor: Gaofan Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/750,835

(22) Filed: Jun. 25, 2015

(65) Prior Publication Data

US 2015/0296338 A1 Oct. 15, 2015

Related U.S. Application Data

(63) Continuation of application No. PCT/CN2013/084861, filed on Oct. 9, 2013.

(30) Foreign Application Priority Data

Dec. 27, 2012 (CN) .......................... 2012 1 0578339

(51) Int. Cl.
*H04W 4/02* (2009.01)
*H04W 4/06* (2009.01)
(Continued)

(52) U.S. Cl.
CPC ............ *H04W 4/02* (2013.01); *H04L 12/1818* (2013.01); *H04L 51/20* (2013.01); *H04W 4/06* (2013.01)

(58) Field of Classification Search
CPC ... H04L 12/1818; H04L 51/28; H04L 51/20; H04W 4/023; H04W 4/206; H04W 4/02; H04W 4/06; H04W 4/08; H04W 4/14; H04W 4/003; H04W 4/00; H04W 4/021; H04W 4/028; H04N 1/00244

USPC ................ 455/18, 90.2, 456.1, 414.1, 456.3; 709/608, 204, 226, 227, 231, 205
See application file for complete search history.

(56) References Cited

U.S. PATENT DOCUMENTS

2005/0096065 A1\* 5/2005 Fleischman ....... H04L 29/12028
455/456.1

(Continued)

FOREIGN PATENT DOCUMENTS

| CN | 101959124 A | 1/2011 |
|----|-------------|--------|
| CN | 102546710 A | 7/2012 |
| CN | 102789508 A | 11/2012 |

OTHER PUBLICATIONS

Tencent Technology, ISRWO, PCT/CN2013/084861, Jan. 16, 2014, 10 pgs.

(Continued)

*Primary Examiner* — Inder Mehra
(74) *Attorney, Agent, or Firm* — Morgan, Lewis & Bockius LLP (57) ABSTRACT

The present disclosure discloses a current geographic location-based communications method, a mobile terminal, and a server, the method including: generating a communications user list for a user identifier corresponding to a target mobile terminal, the communications user list including a plurality of user identifiers; sending at least a portion of the communications user list to the target mobile terminal, the portion of the communications user list including a user identifier of a mobile terminal whose distance to the target mobile terminal is within a preset distance range threshold; receiving a chat request sent by the target mobile terminal, the chat request including one or more user identifiers selected from the portion of the communications user list by the target mobile terminal; and generating a group communication between the target mobile terminal and the mobile terminals whose associated user identifiers have been marked as enabling group chat function.

13 Claims, 5 Drawing Sheets

(51) Int. Cl.
*H04L 12/18* (2006.01)
*H04L 12/58* (2006.01)

(56) References Cited

U.S. PATENT DOCUMENTS

| | | | | |
|---|---|---|---|---|
| 2008/0020718 A1* | 1/2008 | Jin | ...................... | H04W 76/005 455/90.2 |
| 2010/0318662 A1* | 12/2010 | Wie | .................... | H04L 12/1827 709/226 |
| 2012/0272287 A1* | 10/2012 | Kuhlke | ................ | H04W 4/206 726/1 |
| 2013/0053013 A1* | 2/2013 | Giaretta | ................ | H04W 52/02 455/418 |
| 2014/0173515 A1* | 6/2014 | Efrati | .................... | G06Q 10/109 715/811 |
| 2015/0127603 A1* | 5/2015 | Cohen | ..................... | G06F 17/24 707/608 |

OTHER PUBLICATIONS

Tencent Technology, IPRP, PCT/CN2013/084861, Jun. 30, 2015, 5 pgs.

* cited by examiner

GEOGRAPHIC LOCATION-BASED COMMUNICATIONS METHOD, MOBILE TERMINAL, SERVER, AND GEOGRAPHIC LOCATION-BASED COMMUNICATIONS SYSTEM

RELATED APPLICATIONS

This application is a continuation application of PCT Patent Application No. PCT/CN2013/084861, entitled "GEOGRAPHIC LOCATION-BASED COMMUNICATIONS METHOD, MOBILE TERMINAL, SERVER, AND GEOGRAPHIC LOCATION-BASED COMMUNICATIONS SYSTEM" filed on Oct. 9, 2013, which claims priority to Chinese Patent Application No. 201210578339.0, entitled "GEOGRAPHIC LOCATION-BASED COMMUNICATIONS METHOD, MOBILE TERMINAL, SERVER, AND GEOGRAPHIC LOCATION-BASED COMMUNICATIONS SYSTEM" filed on Dec. 27, 2012, both of which are incorporated by reference in their entirety.

FIELD OF THE TECHNOLOGY

The present disclosure relates to the field of computer applications, and in particular, to a current geographic location-based communications method, a mobile terminal, a server, and a current geographic location-based communications system.

BACKGROUND OF THE DISCLOSURE

With development of a computer software technology, an intelligent mobile terminal technology, and the Internet, there are a growing quantity of services that are performed based on a current geographic location of a user, specifically including: based on a current geographic location of a user, sending information about a nearby hotel, information about discounts in a nearby shopping mall, and the like to the user; when the user shakes a mobile phone, connecting another user near this mobile phone who similarly shakes a mobile phone to the user who shakes the mobile phone, so that the two users perform a one-to-one chat.

In the existing technology, a one-to-one chat function can be implemented at most. If there are multiple other users who have a same hobby and interest near a user, the user can perform only a one-to-one chat with each of the other users, to exchange the hobby and interest. In this way, the user needs to repeatedly switch chat interfaces to perform chat sessions, which brings tremendous inconvenience to the user.

SUMMARY

In view of this, according to one aspect of the present disclosure, a current geographic location-based communications method, a mobile terminal, a server, and a current geographic location-based communications system are provided, to enable a group chat between users to be performed based on current geographic locations of the users' mobile terminals.

An embodiment of the present disclosure provide a current geographic location-based communications method performed at a server having one or more processors and memory for storing a plurality of program modules to be executed by the one or more processors, the method including: generating a communications user list for a user identifier corresponding to a target mobile terminal, the communications user list including a plurality of user identifiers, each user identified corresponding to a respective mobile terminal; sending at least a portion of the communications user list to the target mobile terminal, the portion of the communications user list including a user identifier of a mobile terminal whose distance to the target mobile terminal is within a preset distance range threshold; receiving a chat request sent by the target mobile terminal, the chat request including one or more user identifiers selected from the portion of the communications user list by the target mobile terminal; and generating a group communication between the target mobile terminal and the mobile terminals whose associated user identifiers carried in the chat request have been marked as enabling group chat function.

Another embodiment of the present disclosure provides another current geographic location-based communications method performed at a target mobile terminal having one or more processors and memory for storing a plurality of program modules to be executed by the one or more processors and a screen, the method including: displaying a communications user list sent by a server on the screen, the communications user list including user identifiers of mobile terminals whose distance to the target mobile terminal is within a preset distance range threshold; detecting a user selection of one or more of the user identifiers in the communications user list; sending a chat request to the server, the chat request including the one or more user identifiers selected from the communications user list; and displaying a group chat window on the screen, wherein a user of the target mobile terminal is configured to communicate with users of the mobile terminals corresponding to the one or more user identifiers carried in the chat request that have been marked as enabling group chat function.

Yet another embodiment of the present disclosure further provides a server having one or more processors, memory, and a plurality of program modules stored in the memory and to be executed by the one or more processors, wherein the plurality of program modules further include: a generating module, configured to generate a communications user list for a user identifier corresponding to a target mobile terminal, the communications user list including a plurality of user identifiers, each user identified corresponding to a respective mobile terminal; a sending module, configured to send at least a portion of the communications user list to the target mobile terminal, the portion of the communications user list including a user identifier of a mobile terminal whose distance to the target mobile terminal is within a preset distance range threshold; a receiving module, configured to receive a chat request sent by the target mobile terminal, the chat request including one or more user identifiers selected from the portion of the communications user list by the target mobile terminal; and an access module, configured to generate a group communication between the target mobile terminal and the mobile terminals whose associated user identifiers carried in the chat request have been marked as enabling group chat function.

It can be known from the foregoing technical solutions that, in the foregoing aspects of the present disclosure, a user identifier of a group chat user can be marked in a communications user list, to make the user access a group communication according to a selection by the user, implementing a current geographic location-based group chat function, to exchange a hobby and an interest in a chat group, preventing inconvenience brought to the user by that in the existing technology, a user needs to repeatedly switch chat interfaces to perform chat sessions in a one-to-one chat manner.

BRIEF DESCRIPTION OF THE DRAWINGS

To describe technical solutions in embodiments of the present disclosure or in the prior art more clearly, the following briefly introduces accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the specific embodiments of the present disclosure with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
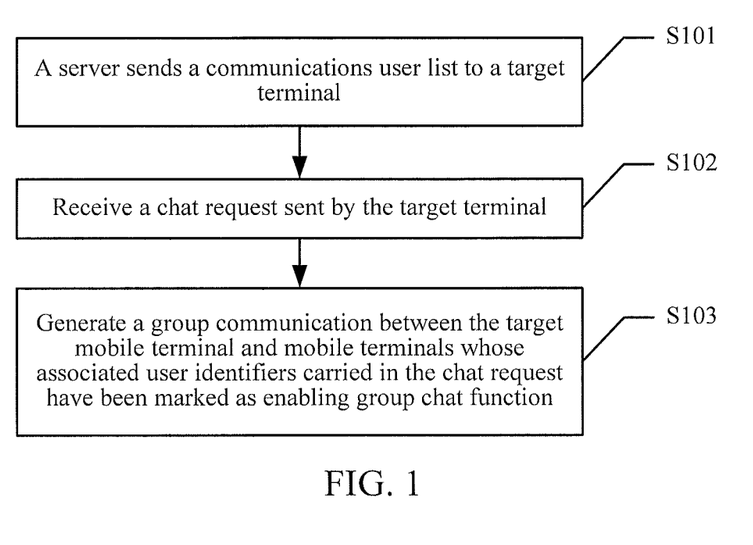
FIG. 1 is a schematic flowchart of a current geographic location-based communications method according to a first embodiment of the present disclosure.

FIG. 1 is a schematic flowchart of a current geographic location-based communications method according to a first embodiment of the present disclosure. The communications method in this embodiment of the present disclosure may be applied in a communications application that can be implemented according to a current geographic location, such as a social networking service (SNS) or an instant messenger (IM), and the communications method may specifically include at least the following steps.

Step S101: A server sends a communications user list to a target mobile terminal, where the communications user list includes a user identifier of a mobile terminal whose distance to the target mobile terminal is within a preset distance range threshold.

In this embodiment of the present disclosure, the communications user list may specifically include a user identifier of a mobile terminal whose distance to the target mobile terminal is within a preset distance range threshold. The distance may be a linear distance between the mobile terminal and the target mobile terminal, and may be acquired through calculation according to current geographic location coordinates that are reported by a terminal after location by the terminal in a manner such as a global positioning system (GPS). The preset distance range threshold is a preset value, which may be a numerical value such as 100 meters or 50 meters. A difference between the distance acquired through calculation and the preset distance range threshold is calculated by using an absolute value, and then whether to add a user identifier of a mobile terminal to the communications user list to display to a user may be determined. The server may determine in real time, to send a latest communications user list to the target mobile terminal.

The target mobile terminal is a terminal in which a corresponding current geographic location-based communications application is enabled, and a data connection is established to a communications application server to experience applications such as the SNS or the IM.

Specifically, the communications user list includes at least a user identifier marked as a group chat user, where a user that is not marked is a one-to-one chat user; and may also include a user identifier that is not marked as a group chat user or is marked as a one-to-one chat user. A user identifier in the communications user list may be a user account number of a chat application that the user log in on the terminal, for example, a user account number of an instant messaging application, or be directly a terminal name, for example, an Apple mobile phone. A mark that is provided for a user identifier in the communications user list may be a text or picture identifier, for example, a word "group" is marked on a user account number, to mark a user corresponding to the user account number as a group chat user who wishes to perform a multi-person group chat.

In some embodiment, the server generates the communications user list for a user identifier corresponding to the target mobile terminal, the communications user list including a plurality of user identifiers, each user identified corresponding to a respective mobile terminal.

Step S102: Receive a chat request sent by the target mobile terminal, where the chat request carries one or more user identifiers selected from the portion of the communications user list by the target mobile terminal.

In this embodiment of the present disclosure, after the communications user list is sent to the target mobile terminal, the target mobile terminal displays the list to the user, so that the user selects one or multiple users from the communications user list to initiate a one-to-one communication, to perform a chat application. A user of the target mobile terminal may select, according to a need, a user identifier marked as a group chat in the list, or may select a user identifier marked as a one-to-one chat in the list. After a user identifier is selected, a chat request is sent to the server.

Step S103: When the user identifier carried in the chat request is a user identifier marked as enabling group chat function, the server generates a group communication between the target mobile terminal and the mobile terminals whose associated user identifiers carried in the chat request have been marked as enabling group chat function.

Specifically, the chat request may carry only the selected user identifier in the target mobile terminal, and the server determines whether a user corresponding to the user identifier is a group chat user according to the chat request; or the chat request carries not only the selected user identifier in the target mobile terminal, but also mark information of the user identifier, and the server may directly process the chat request of the target mobile terminal according to the mark information.

In the step S103, if the user corresponding to the selected user identifier is already in a group communication, the target mobile terminal is directly added to a group communication in which the user corresponding to the user identifier is located. If the user corresponding to the selected user identifier is currently not in any group communication, a group is created for the user corresponding to the selected user identifier marked as a group chat user, where the group includes the user of the target mobile terminal and the user corresponding to the selected user identifier, and any one of other terminals in which the chat application is enabled may also access this group by using the user identifier of the target mobile terminal or the selected user identifier.

It can be known from description of the foregoing embodiment that, in an implementation of this embodiment of the present disclosure, the current geographic location-based communications method has the following beneficial effects: a user identifier of a group chat user can be marked in a communications user list, to make the user identifier access a group communication according to a selection by a user, implementing a current geographic location-based group chat function, to exchange a hobby and an interest in a chat group, preventing inconvenience brought to the user by that in the existing technology, the user needs to repeatedly switch chat interfaces to perform chat sessions in a one-to-one chat manner.

The foregoing describes a current geographic location-based communications method according to an embodiment of the present disclosure in detail.

According to another embodiment of the present disclosure, another current geographic location-based communications method is further provided.

Figure 2:
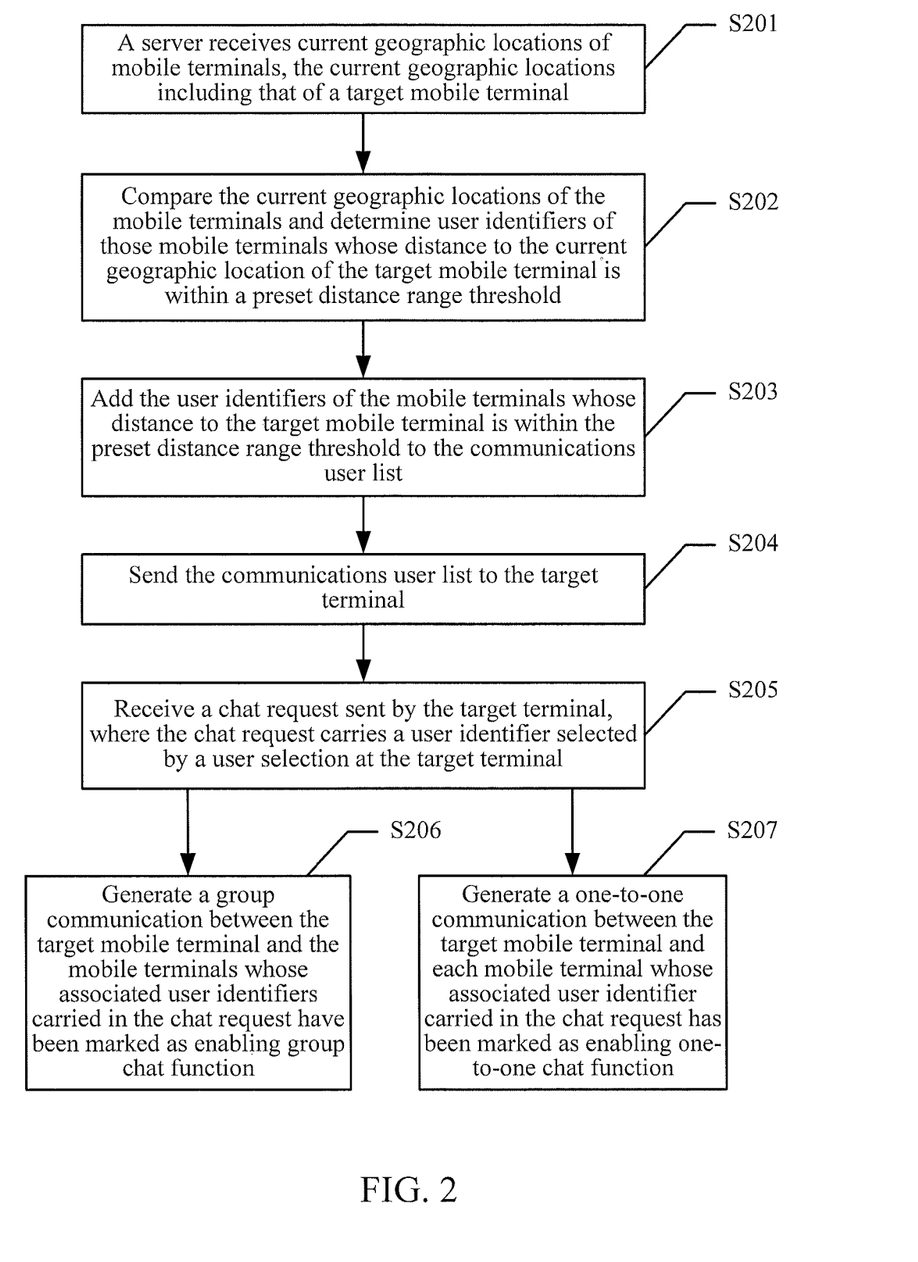
FIG. 2 is a schematic flowchart of a current geographic location-based communications method according to a second embodiment of the present disclosure.

FIG. 2 is a schematic flowchart of a current geographic location-based communications method according to a second embodiment of the present disclosure. The communications method in this embodiment of the present disclosure may be applied in an application such as an application that initiates user communication based on a current geographic location, and may specifically include at least the following steps.

Step S201: A server receives current geographic locations of mobile terminals, the current geographic locations including that of a target mobile terminal.

The target mobile terminal and another mobile terminal are both terminals in which a corresponding current geographic location-based communications application is enabled, for example, some current geographic location-based IM applications, and a data connection is established to a communications application server to experience the current geographic location-based application. After the current geographic location-based communications application is enabled, each mobile terminal may request for performing a group chat, that is, when receiving a request for enabling a group chat function that is sent by a mobile terminal, the server adds a user identifier corresponding to the mobile terminal as a group chat user.

In this embodiment of the present disclosure, the server may determine current geographic location information of the target mobile terminal and each of other mobile terminals in a base station location manner or a manner in which the target mobile terminal and the mobile terminal are triggered to perform GPS location and reporting.

In this embodiment of the present disclosure, although the current geographic locations of the mobile terminals are received at different times, a first one and a last one of the current geographic locations are received within a predefined time window (e.g., five seconds) in order to be processed subsequently.

Step S202: Compare the current geographic locations of the mobile terminals and determine user identifiers of those mobile terminals whose distance to the current geographic location of the target mobile terminal is within a preset distance range threshold.

In this embodiment of the present disclosure, the current geographic location is specifically geographic coordinate information; a distance from a mobile terminal to the target mobile terminal is determined through calculation according to the coordinate information; and if a value of the distance is within the preset distance range threshold, the mobile terminal is added. In the S202, one or multiple mobile terminals may be determined according to a distance between terminals.

Step S203: Add the user identifiers of the mobile terminals whose distance to the target mobile terminal is within the preset distance range threshold to the communications user list.

Further, a process of adding the determined user identifier corresponding to the mobile terminal into the communications list further includes marking some user identifiers in the list as group chat users, where user corresponding to these user identifiers are user identifiers corresponding to users who have requested for and been added as enabling a group chat function. Specifically, when receiving a request for enabling a group chat function that is sent by a mobile terminal, the server adds a user identifier corresponding to the mobile terminal as a group chat user. A mark may be a text mark or a picture mark.

Step S204: Send the communications user list to the target terminal.

Step S205: Receive a chat request sent by the target terminal, where the chat request carries a user identifier selected by a user selection at the target terminal.

In this embodiment of the present disclosure, after the communications user list is sent to the target mobile terminal, the target mobile terminal displays the list to the user, so that the user selects one or multiple users from the communications user list to initiate a one-to-one communication, to perform a corresponding current geographic location-based application. A user of the target mobile terminal may select, according to a need, a user identifier marked as a group chat in the list, or may select a user identifier marked as a one-to-one chat in the list. The step S205 specifically includes: detecting a user identifier that carries a user selection and is returned by the target mobile terminal, to determine whether a selection operation in the target mobile terminal on a user identifier in the communications user list is selection of a user identifier marked as a group chat user or a selection of a user identifier marked as a one-to-one chat user; and performing the following S206 or S207 according to a determining result.

Step S206: Generate a group communication between the target mobile terminal and the mobile terminals whose associated user identifiers carried in the chat request have been marked as enabling group chat function.

In this embodiment of the present disclosure, if the user corresponding to the selected user identifier is already in a group communication, the target mobile terminal is directly added to a group communication in which the user corresponding to the user identifier is located. If the user corresponding to the selected user identifier is currently not in any group communication, a group is created for the user corresponding to the selected user identifier marked as a group chat user, where the group includes the user of the target mobile terminal and the user corresponding to the selected user identifier, and any one of other terminals in which a current geographic location-based application is enabled may also access this group by using the user identifier of the target mobile terminal or the selected user identifier.

Step S207: Generate a one-to-one communication between the target mobile terminal and each mobile terminal whose associated user identifier carried in the chat request has been marked as enabling one-to-one chat function.

In this embodiment of the present disclosure, when a one-to-one chat user is selected, a server establishes a data connection from the target mobile terminal to a mobile terminal corresponding to a user identifier of the one-to-one chat user according to a user identifier of the one-to-one chat user, implementing mutual sending of data between the target mobile terminal and the mobile terminal.

Figure 3:
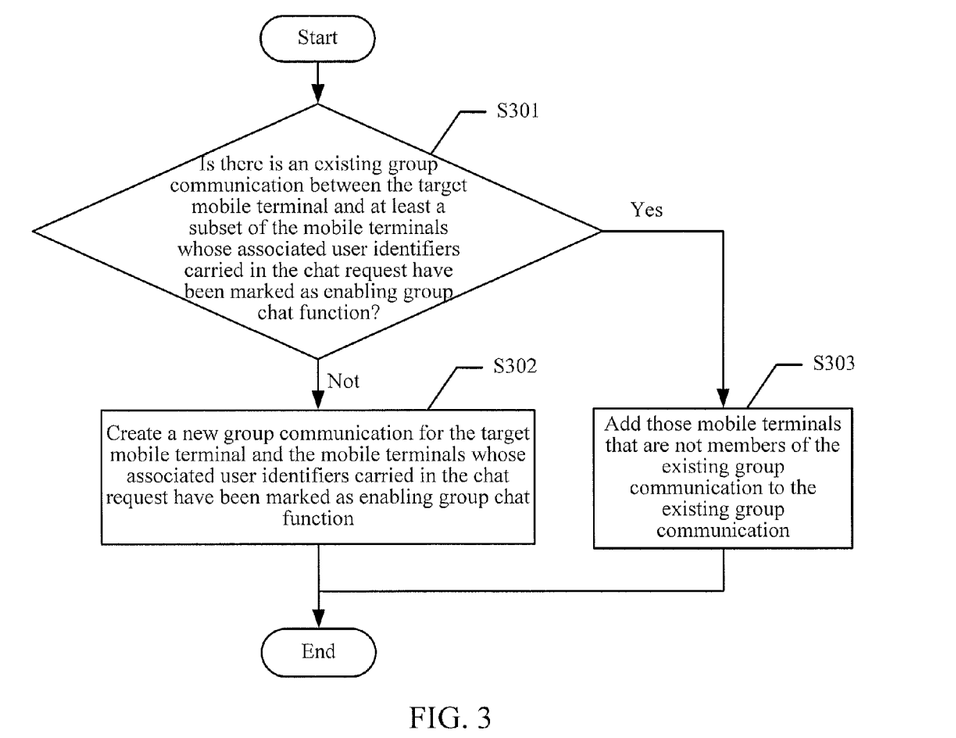
FIG. 3 is a schematic flowchart of a specific method for making a target mobile terminal access a group communication according to an embodiment of the present disclosure.

FIG. 3 is a schematic flowchart of a specific method for making a target mobile terminal access a group communication according to an embodiment of the present disclosure. The method may include at least the following steps.

Step S301: The server determines whether there is an existing group communication between the target mobile terminal and at least a subset of the mobile terminals whose associated user identifiers carried in the chat request have been marked as enabling group chat function. In some embodiments, there is already a group communication between multiple mobile terminals associated with different users and the process disclosed herein is used for adding one or more new users to the group communication. For example, a group of persons having dinner together may be interested in generating a group communication for their communication. But since different people may not come to the dinner location (e.g., a restaurant) at the same time, there is a chance of adding new members to an existing group communication that has already been established.

Step S302: If not, the server creates a new group communication for the target mobile terminal and the mobile terminals whose associated user identifiers carried in the chat request have been marked as enabling group chat function.

Step S303: If yes, the server adds those mobile terminals that are not members of the existing group communication to the existing group communication.

It can be known from description of the foregoing embodiment that, in an implementation of this embodiment of the present disclosure, there are the following beneficial effects:

A user identifier of a group chat user can be marked in a communications user list, and a user identifier that performs only a one-to-one chat can be included in the communications user list at the same time, which not only may enable a user to choose, according to a need, to make it access a group communication, implementing a current geographic location-based group chat function, to exchange a hobby and an interest in a chat group, but also may perform a one-to-one chat function according to a need of the user, meeting a chat requirement of the user in a comparatively all-round manner, with a convenient operation.

The foregoing describes a current geographic location-based communications method according to an embodiment of the present disclosure in detail.

According to another embodiment of the present disclosure, another current geographic location-based communications method is further provided.

Figure 4:
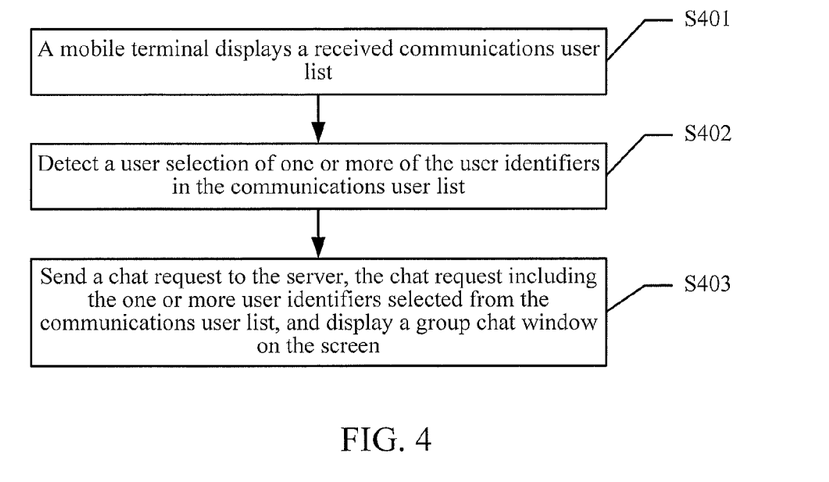
FIG. 4 is a schematic flowchart of a current geographic location-based communications method according to another embodiment of the present disclosure.

FIG. 4 is a schematic flowchart of a current geographic location-based communications method according to another embodiment of the present disclosure. The method in this embodiment is applied in a mobile terminal of a communications application such as an SNS or an IM that may be implemented according to a current geographic location, and specifically the method may include at least the following steps.

Step S401: A mobile terminal displays a received communications user list, where the communications user list includes a user identifier of a mobile terminal whose distance to the mobile terminal is within a preset distance range threshold.

In this embodiment of the present disclosure, a server is a server that correspondingly provides the mobile terminal with an application service such as the SNS or the IM that may be implemented according to a current geographic location. The implementation manners in the foregoing method embodiments may be used as manners in which the server generates the communications user list. Details are not provided again herein.

Step S402: Detect a user selection of one or more of the user identifiers in the communications user list.

Step S403: Send a chat request to the server, the chat request including the one or more user identifiers selected from the communications user list, and display a group chat window on the screen.

In this embodiment of the present disclosure, the detecting a selection operation may be implemented according to an existing touch panel tapping event or a cursor selection event by using a keyboard; that is, according to location coordinates of a contact or a cursor on a screen of a mobile terminal such as a mobile phone, the selection operation may be determined and whether the selection operation selects a user identifier marked as a group chat user may be determined.

In addition, when detecting a selection operation that includes enabling a group chat function, the mobile terminal sends a request for enabling the group chat function to the server, so that the server adds a user identifier corresponding to this terminal as a group chat user according to the request for enabling a group chat function.

It can be known from description of the foregoing embodiment that, in an implementation of this embodiment of the present disclosure, the current geographic location-based communications method has the following beneficial effects: a user identifier of a group chat user can be marked in a communications user list, and a user identifier that performs only a one-to-one chat can be included in the communications user list at the same time, which not only may enable a user to choose, according to a need, to make it access a group communication, implementing a current geographic location-based group chat function, to exchange a hobby and an interest in a chat group, but also may perform a one-to-one chat function according to a need of the user, meeting a chat requirement of the user in a comparatively all-round manner, with a convenient operation.

The foregoing describes a current geographic location-based communications method according to an embodiment of the present disclosure in detail.

According to another embodiment of the present disclosure, a server is provided.

Figure 5:
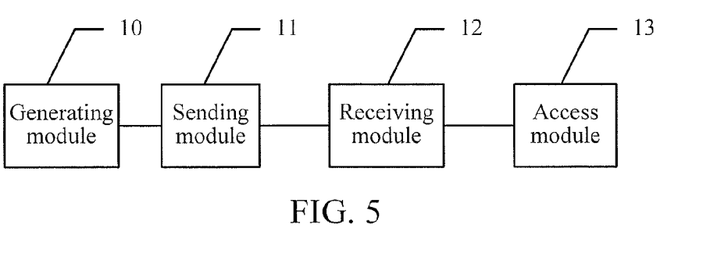
FIG. 5 is a schematic structural composition diagram of a server according to an embodiment of the present disclosure.

FIG. 5 is a schematic structural composition diagram of a server according to an embodiment of the present disclosure. The server in this embodiment of the present disclosure may be set in an application server that initiates user communication based on a current geographic location, and the server including one or more processors, memory and a plurality of program modules stored in the memory and to be executed by the one or more processors, the plurality of program modules further including:

a generating module 10, configured to generate a communications user list for a user identifier corresponding to a target mobile terminal, the communications user list including a plurality of user identifiers, each user identified corresponding to a respective mobile terminal;

a sending module 11, configured to send at least a portion of the communications user list to the target mobile terminal, the portion of the communications user list including a user identifier of a mobile terminal whose distance to the target mobile terminal is within a preset distance range threshold;

a receiving module 12, configured to receive a chat request sent by the target mobile terminal, the chat request including one or more user identifiers selected from the portion of the communications user list by the target mobile terminal; and an access module 13, configured to generate a group communication between the target mobile terminal and the mobile terminals whose associated user identifiers carried in the chat request have been marked as enabling group chat function.

The target mobile terminal is a mobile terminal in which a corresponding current geographic location-based communications application is enabled, and a data connection is established to a server in which a communications application is set, to experience an application such as an SNS or an IM.

In this embodiment of the present disclosure, the communications user list includes at least a user identifier marked as a group chat user, where a user that is not marked is a one-to-one chat user; and may also include a user identifier that is not marked as a group chat user or is marked as a one-to-one chat user. A user identifier in the communications user list may be a user account number of a chat application that the user log in on the terminal, for example, a user account number of an instant messaging application, or be directly a terminal name, for example, an Apple mobile phone. A mark that is provided for a user identifier in the communications user list may be a text or picture identifier, for example, a word "group" is marked on a user account number, to mark a user corresponding to the user account number as a group chat user who wishes to perform a multi-person group chat.

After the sending module 11 sends the communications user list to the target mobile terminal, the target mobile terminal displays the list to the user, so that the user selects one or multiple users from the communications user list to initiate a one-to-one communication, to implement a current geographic location-based communications application. A user of the target mobile terminal may select, according to a need, a user identifier marked as a group chat in the list, or may select a user identifier marked as a one-to-one chat in the list.

After the user selects a user identifier in the target mobile terminal, the target mobile terminal returns a corresponding chat request that carries the user identifier to the server, and the receiving module 12 specifically determines, according to the chat request, whether the user selects a group chat user; and if yes, notifies the access module 13.

If the user corresponding to the selected user identifier is already in a group communication, the access module 13 directly adds the target mobile terminal to a group communication in which the user corresponding to the user identifier is located. If the user corresponding to the selected user identifier is currently not in any group communication, the access module 13 creates a group for the user corresponding to the selected user identifier marked as a group chat user, where the group includes the user of the target mobile terminal and the user corresponding to the selected user identifier, and any one of other terminals in which a current geographic location-based application is enabled may also access this group by using the user identifier of the target mobile terminal or the selected user identifier.

It can be known from description of the foregoing embodiment that, an implementation of this embodiment of the present disclosure has the following beneficial effects: in the present disclosure, a user identifier of a group chat user can be marked in a communications user list, to make the user identifier access a group communication according to a selection by a user, implementing a current geographic location-based group chat function, to exchange a hobby and an interest in a chat group, preventing inconvenience brought to the user by that in the existing technology, the user needs to repeatedly switch chat interfaces to perform chat sessions in a one-to-one chat manner.

The foregoing describes a server according to an embodiment of the present disclosure in detail.

According to another embodiment of the present disclosure, another server is further provided.

Figure 6:
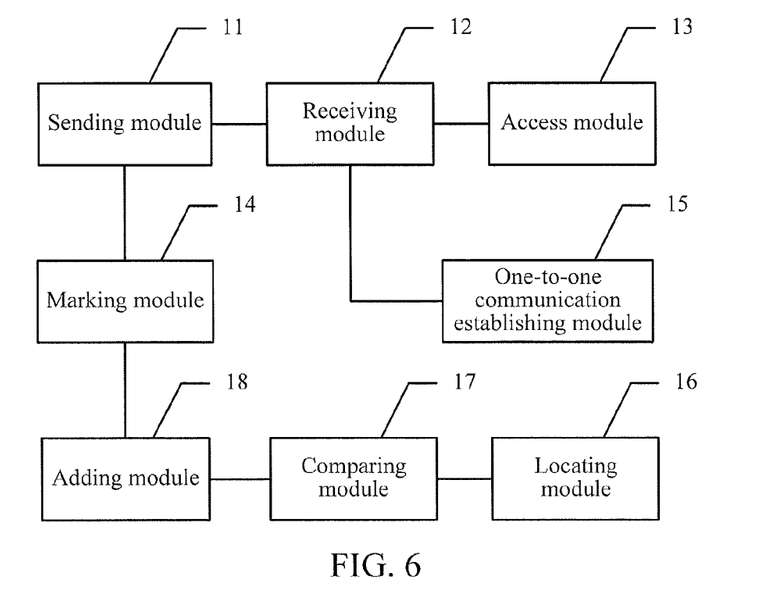
FIG. 6 is a schematic structural composition diagram of another server according to an embodiment of the present disclosure.

Specifically, FIG. 6 is a schematic structural composition diagram of another server according to an embodiment of the present disclosure. The server in this embodiment of the present disclosure may be set in an application server that initiates user communication based on a current geographic location, the server includes the sending module 11 (that includes the generating module 10), the receiving module 12, and the access module 13 in the foregoing embodiment, and in this embodiment, the server may further include the following parts:

a marking module 14, configured to, when a request for enabling a group chat function that is sent by a mobile terminal is received, add a user identifier corresponding to the mobile terminal as a group chat user.

In this embodiment of the present disclosure, that is, in any terminal in which a corresponding current geographic location-based communications application is enabled, the user may set the group chat function according to a need, and when receiving the request for enabling a group chat function sent by these mobile terminals, the marking module 14 of the server adds a user identifier corresponding to the mobile terminal as a group chat user, so that when a communications user list of a corresponding target mobile terminal is generated, marks, by using text or a picture in the list, a user identifier in the list that needs to perform a group chat.

Further, the server in this embodiment of the present disclosure may further include the following part:

a one-to-one communication establishing module 15, configured to: when a user identifier marked as a one-to-one chat user is selected in the target mobile terminal, establish a one-to-one communication from the target mobile terminal to a terminal corresponding to the user identifier marked as a one-to-one chat user. Specifically, when the user identifier carried in the received chat request is a user identifier marked as a one-to-one chat user, the one-to-one communication establishing module 15 establishes a one-to-one communication from the target mobile terminal to a terminal corresponding to the user identifier marked as a one-to-one chat user.

That is, if it is determined according to the chat request that carries the user identifier and is returned by the target mobile terminal that the user selects a one-to-one chat user, the one-to-one communication establishing module 15 establishes a data connection from the target mobile terminal to a mobile terminal corresponding to a user identifier of the one-to-one chat user according to a user identifier of the one-to-one chat user, implementing mutual sending of data between the target mobile terminal and the mobile terminal.

Further, the server in this embodiment of the present disclosure may further include the following modules:

a locating module 16, configured to receive current geographic locations of a plurality of mobile terminals, the current geographic locations including a current geographic location of the target mobile terminal;

a comparing module 17, configured to compare the current geographic locations of the plurality of mobile terminals and determining user identifiers of one or more mobile terminals whose distance to the current geographic location of the target mobile terminal is within the preset distance range threshold; and an adding module 18, configured to add the determined user identifiers of the mobile terminals whose distance to the current geographic location of the target mobile terminal is within the preset distance range threshold to the communications user list.

In this embodiment of the present disclosure, the locating module 16 may determine current geographic location information of each terminal in a base station location manner or a manner in which the target mobile terminal and the mobile terminal are triggered to perform GPS location and reporting.

The current geographic location is specifically geographic coordinate information; the comparing module 17 determines a distance from a mobile terminal to the target mobile terminal through calculation according to the coordinate information; and if a value of the distance is within the preset distance range threshold, the mobile terminal is added. One or multiple mobile terminals may be determined according to a distance between terminals.

The adding module 18 separately adds mobile terminals in turn that are determined through comparison by the comparing module 17 into a communications user list, to send the list to a user for selection.

Figure 7:
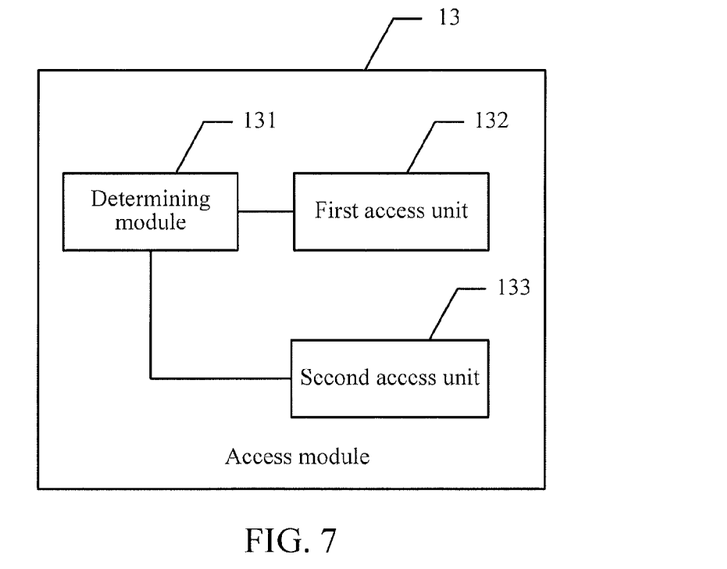
FIG. 7 is a specific schematic structural composition diagram of an access module shown in FIG. 6.

Further, FIG. 7 is a specific schematic structural composition diagram of an access module shown in FIG. 6. The access module 13 in this embodiment may specifically include the following parts:

a determining module 131, configured to determine whether there is an existing group communication between the target mobile terminal and at least a subset of the mobile terminals whose associated user identifiers carried in the chat request have been marked as enabling group chat function;

a first access unit 132, configured to, when there is an existing group communication, add those mobile terminals that are not members of the existing group communication to the existing group communication; and a second access unit 133, configured to, when there is no existing group communication, creating a new group communication for the target mobile terminal and the mobile terminals whose associated user identifiers carried in the chat request have been marked as enabling group chat function.

In another embodiment of the present disclosure, the current geographic location-based communications method shown in FIG. 1, FIG. 2, and FIG. 3 may be a current geographic location-based communications method that is executed by units in the servers shown in FIG. 5, FIG. 6, and FIG. 7. For example, step S101 shown in FIG. 1 and step S204 shown in FIG. 2 may be performed by the sending module 11 shown in FIG. 5. Step S102 shown in FIG. 1 and step S205 shown in FIG. 2 may be performed by the receiving module 12 shown in FIG. 5. Step S103 shown in FIG. 1 and step S206 shown in FIG. 2 may be performed by the access module 13 shown in FIG. 5. Step S201 shown in FIG. 2 may be performed by the locating module 16 shown in FIG. 6. Step S202 shown in FIG. 2 may be performed by the comparing module 17 shown in FIG. 6. Step S203 shown in FIG. 2 may be performed by the adding module 18 shown in FIG. 6. Step S207 shown in FIG. 2 may be performed by the one-to-one communication establishing module 15 shown in FIG. 6. Step S301 shown in FIG. 3 may be performed by the determining module 131 of the access module 13 shown in FIG. 7. Step S302 shown in FIG. 3 may be performed by the access module 13 of the first access unit 132 shown in FIG. 7. Step S303 shown in FIG. 3 may be performed by the access module 13 of the second access unit 133 shown in FIG. 7.

According to another embodiment of the present disclosure, units in the servers shown in FIG. 5 and FIG. 6 may be separately or all combined into one or several other modules for composition, or some units thereof may further be divided into multiple functionally smaller units for composition. This may implement same operations, without affecting an implementation of technical effects of embodiments of the present disclosure. The foregoing units are divided based on logic functions, and in an actual application, a function of one unit may also be implemented by multiple units, or functions of multiple units may be implemented by one unit. In another embodiment of the present disclosure, the servers may also include another module. However, in the actual application, these functions may also be implemented with assistance from another unit, and may be implemented in cooperation by multiple units.

According to another embodiment of the present disclosure, the servers shown in FIG. 5, FIG. 6, and FIG. 7 may be constructed, and a current geographic location-based communications method according to an embodiment of the present disclosure may be implemented, by running, on a general-purpose computing device such as a computer that includes a processing component and a storage medium, a computer program (including program code) that can execute the current geographic location-based communications method shown in FIG. 1, FIG. 2, and FIG. 3. For example, the computer program may be added in a computer readable storage medium, and loaded into the foregoing computing device by using the computer readable storage medium, and run in the foregoing computing device.

The storage medium includes but is not limited to: a flash drive, a read-only memory (ROM), a random access memory (RAM), a magnetic disk, or an optical disc.

It can be known from description of the foregoing embodiment that, this embodiment of the present disclosure has the following beneficial effects: in the present disclosure, a user identifier of a group chat user can be marked in a communications user list, and a user identifier that performs only a one-to-one chat can be included in the communications user list at the same time, which not only may enable a user to choose, according to a need, to make it access a group communication, implementing a current geographic location-based group chat function, to exchange a hobby and an interest in a chat group, but also may perform a one-to-one chat function according to a need of the user, meeting a chat requirement of the user in a comparatively all-round manner, with a convenient operation.

The foregoing describes a server according to an embodiment of the present disclosure in detail.

According to another embodiment of the present disclosure, a mobile terminal is further provided.

Figure 8:
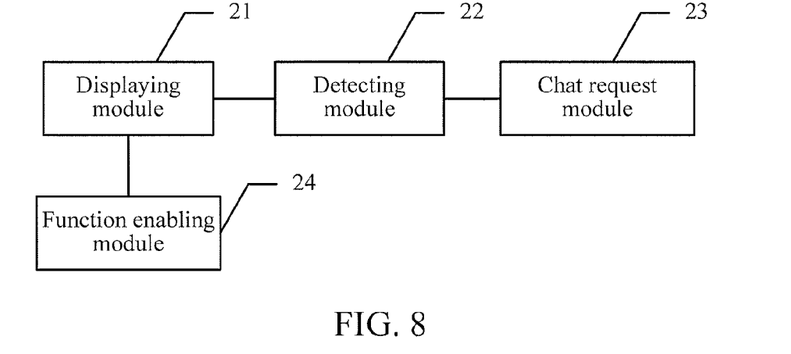
FIG. 8 is a schematic structural composition diagram of a mobile terminal according to an embodiment of the present disclosure.

Further, FIG. 8 is a schematic structural composition diagram of a mobile terminal according to an embodiment of the present disclosure. The mobile terminal in this embodiment of the present disclosure may be a mobile terminal that is applied in a communications application such as an SNS or an IM that may be implemented according to a current geographic location, and specifically the mobile terminal includes one or more processors, memory and a plurality of program modules such as:

a displaying module 21, configured to display a communications user list sent by a server on the screen, the communications user list including user identifiers of mobile terminals whose distance to the target mobile terminal is within a preset distance range threshold;

a detecting module 22, configured to detect a user selection of one or more of the user identifiers in the communications user list; and a chat request module 23, configured to send a chat request to the server, the chat request including the one or more user identifiers selected from the communications user list.

Further, the mobile terminal may further include: a function enabling module 24, configured to: when it is detected that a selection operation that includes enabling a group chat function, send a request for enabling the group chat function to the server, so that the server adds a user identifier corresponding to this terminal as a group chat user according to the request for enabling a group chat function.

In another embodiment of the present disclosure, the current geographic location-based communications method shown in FIG. 4 may be executed by units in the mobile terminal that are shown in FIG. 8. For example, Step S401 shown in FIG. 4 may be performed by the displaying module 21 shown in FIG. 8. Step S402 shown in FIG. 4 may be performed by the detecting module 22 shown in FIG. 8. Step S403 shown in FIG. 4 may be performed by the chat request module 23 shown in FIG. 8.

According to another embodiment of the present disclosure, units in the mobile terminal that are shown in FIG. 8 may be separately or all combined into one or several other modules for composition, or some units thereof may further be divided into multiple functionally smaller units for composition. This may implement same operations, without affecting an implementation of technical effects of embodiments of the present disclosure. The foregoing units are divided based on logic functions, and in an actual application, a function of one unit may also be implemented by multiple units, or functions of multiple units may be implemented by one unit. In another embodiment of the present disclosure, the servers may also include another module. However, in the actual application, these functions may also be implemented with assistance from another unit, and may be implemented in cooperation by multiple units.

According to another embodiment of the present disclosure, the mobile terminal shown in FIG. 8 may be constructed, and a current geographic location-based communications method according to an embodiment of the present disclosure may be implemented, by running, on a general-purpose computing device such as a computer that includes a processing component and a storage medium, a computer program (including program code) that can execute the current geographic location-based communications method shown in FIG. 4. For example, the computer program may be added in a non-transitory computer readable storage medium, and loaded into the foregoing computing device by using the computer readable storage medium, and run in the foregoing computing device.

The storage medium includes but is not limited to: a flash drive, a ROM, a RAM, a magnetic disk, or an optical disc.

It can be known from description of the foregoing embodiment that, this embodiment of the present disclosure has the following beneficial effects: a user identifier of a group chat user can be marked in a communications user list, and a user identifier that performs only a one-to-one chat can be included in the communications user list at the same time, which not only may enable a user to choose, according to a need, to make it access a group communication, implementing a current geographic location-based group chat function, to exchange a hobby and an interest in a chat group, but also may perform a one-to-one chat function according to a need of the user, meeting a chat requirement of the user in a comparatively all-round manner, with a convenient operation.

The foregoing describes a mobile terminal according to an embodiment of the present disclosure in detail.

According to another embodiment of the present disclosure, a current geographic location-based communications system is further provided.

Figure 9:
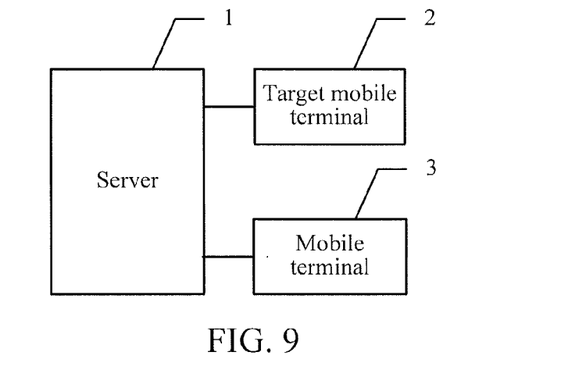
FIG. 9 is a schematic structural composition diagram of a current geographic location-based communications system according to an embodiment of the present disclosure.

FIG. 9 is a schematic structural composition diagram of a current geographic location-based communications system according to an embodiment of the present disclosure. The system in this embodiment of the present disclosure includes: a server 1 and multiple mobile terminals, where the multiple mobile terminals include a target mobile terminal 2 and a mobile terminal 3.

The server 1 is configured to send a communications user list to the target mobile terminal 2, where the communications user list includes a user identifier of a mobile terminal 3 whose distance to the target mobile terminal 2 is within a preset distance range threshold.

The target mobile terminal 2 is configured to display the received communications user list, and detect a selection operation on a user identifier in the communications user list; and send a chat request to the server if it is detected that a user identifier marked as a group chat user is selected in the selection operation, where the chat request carries the user identifier selected in the selection operation of the target mobile terminal.

The server 1 may be further configured to receive the chat request sent by the target mobile terminal 2; and if the user identifier carried in the chat request is a user identifier marked as a group chat user, make the target mobile terminal 2 access a group communication corresponding to the user identifier marked as a group chat user.

Further, the server 1 may be further configured to: when the user identifier carried in the received chat request is a user identifier marked as a one-to-one chat user, establish a one-to-one communication from the target mobile terminal 2 to a mobile terminal corresponding to the user identifier marked as a one-to-one chat user.

Specifically, an implementation manner of the server in the foregoing FIG. 5, FIG. 6, or FIG. 7 may be used as an implementation manner of the server 1, and an implementation manner of the mobile terminal in an embodiment corresponding to the foregoing FIG. 8 may be used as an implementation manner of the target mobile terminal 2. Details are not provided again herein.

It can be known from description of the foregoing embodiment that, this embodiment of the present disclosure has the following beneficial effects: a user identifier of a group chat user can be marked in a communications user list, and a user identifier that performs only a one-to-one chat can be included in the communications user list at the same time, which not only may enable a user to choose, according to a need, to make it access a group communication, implementing a current geographic location-based group chat function, to exchange a hobby and an interest in a chat group, but also may perform a one-to-one chat function according to a need of the user, meeting a chat requirement of the user in a comparatively all-round manner, with a convenient operation.

A person of ordinary skill in the art may understand that all or some of the processes of the method embodiments may be implemented by a computer program instructing relevant hardware. The program may be stored in a computer readable storage medium. When the program runs, the processes of the method embodiments are performed.

Disclosed above are only preferred embodiments of the present disclosure, and cannot be considered as limitations on the present disclosure. The protection scope of the present disclosure is defined by subsequently attached claims. Any modification, replacement, and improvement made without departing from the spirit and principle of the present disclosure still fall within the scope of the claims of the present disclosure.

What is claimed is:

1. A current geographic location-based communications method, comprising:
   at a server having one or more processors and memory for storing a plurality of program modules to be executed by the one or more processors:
      generating a communications user list for a user identifier corresponding to a target mobile terminal, the communications user list including a plurality of user identifiers, each user identifier corresponding to a respective mobile terminal, wherein the generating includes:
         receiving current geographic locations of a plurality of mobile terminals, the current geographic locations including a current geographic location of the target mobile terminal;
         comparing the current geographic locations of the plurality of mobile terminals and determining user identifiers of one or more mobile terminals whose distance to the current geographic location of the target mobile terminal is within the preset distance range threshold; and
         adding the determined user identifiers of the mobile terminals whose distance to the current geographic location of the target mobile terminal is within the preset distance range threshold to the communications user list;
      sending at least a portion of the communications user list to the target mobile terminal, the portion of the communications user list including a user identifier of a mobile terminal whose distance to the current geographic location of the target mobile terminal is within the preset distance range threshold;
      receiving a chat request sent by the target mobile terminal, the chat request including one or more user identifiers selected from the portion of the communications user list by the target mobile terminal; and
      generating a group communication between the target mobile terminal and the mobile terminals whose associated user identifiers carried in the chat request have been marked as enabling group chat function.

2. The method according to claim 1, wherein the step of generating a group communication between the target mobile terminal and the mobile terminals whose associated user identifiers carried in the chat request have been marked as enabling group chat function further comprises:
   determining whether there is an existing group communication between the target mobile terminal and at least a subset of the mobile terminals whose associated user identifiers carried in the chat request have been marked as enabling group chat function;
   when there is an existing group communication, adding those mobile terminals that are not members of the existing group communication to the existing group communication; and
   when there is no existing group communication, creating a new group communication for the target mobile terminal and the mobile terminals whose associated user identifiers carried in the chat request have been marked as enabling group chat function.

3. The method according to claim 1, wherein the communications user list is generated upon receipt of a request for enabling group chat function from the target mobile terminal.

4. The method according to claim 1, further comprising:
   generating a one-to-one communication between the target mobile terminal and each mobile terminal whose associated user identifier carried in the chat request has been marked as enabling one-to-one chat function.

5. The method according to claim 1, wherein a first one of the current geographic locations of the plurality of mobile terminals and a last one of the current geographic locations of the plurality of mobile terminals are received within a predefined time window.

6. A current geographic location-based communications method, comprising:
   at a target mobile terminal having one or more processors and memory for storing a plurality of program modules to be executed by the one or more processors and a screen:
      detecting a user selection of enabling group chat function at the target mobile terminal;
      sending a request for enabling the group chat function to a server, wherein the server is configured to add a user identifier corresponding to the target mobile terminal to a communications user list according to the request for enabling the group chat function and the communications user list includes user identifiers of mobile terminals whose distance to the target mobile terminal is within a preset distance range threshold;
      displaying the communications user list sent by the server on the screen;
      detecting a user selection of one or more of the user identifiers in the communications user list;
      sending a chat request to the server, the chat request including the one or more user identifiers selected from the communications user list; and
      displaying a group chat window on the screen, wherein a user of the target mobile terminal is configured to communicate with users of the mobile terminals corresponding to the one or more user identifiers carried in the chat request that have been marked as enabling group chat function.

7. The method according to claim 6, further comprising:
   adding one or more one-to-one chat entries to a chat list on the screen, each one-to-one chat entry corresponding to a mobile terminal whose associated user identifier carried in the chat request has been marked as enabling one-to-one chat function;

detecting a user selection of one of the one or more one-to-one chat entries in the chat list on the screen; and displaying a one-to-one chat window between the target mobile terminal and a corresponding mobile terminal whose associated user identifier has been marked as enabling one-to-one chat function.

8. The method according to claim 6, wherein the user identifiers in the communications user list are identified, at least in part, based on current geographic locations of their associated mobile terminals received within a predefined time window.

9. A server, comprising:
one or more processors;
memory; and
a plurality of program modules stored in the memory and to be executed by the one or more processors, wherein the plurality of program modules further include:
   a generating module, configured to generate a communications user list for a user identifier corresponding to a target mobile terminal, the communications user list including a plurality of user identifiers, each user identifier corresponding to a respective mobile terminal;
   a locating module, configured to receive current geographic locations of a plurality of mobile terminals, the current geographic locations including a current geographic location of the target mobile terminal;
   a comparing module, configured to compare the current geographic locations of the plurality of mobile terminals and determining user identifiers of one or more mobile terminals whose distance to the current geographic location of the target mobile terminal is within the preset distance range threshold;
   an adding module, configured to add the determined user identifiers of the mobile terminals whose distance to the current geographic location of the target mobile terminal is within the preset distance range threshold to the communications user list;
   a sending module, configured to send at least a portion of the communications user list to the target mobile terminal, the portion of the communications user list including a user identifier of a mobile terminal whose distance to the current geographic location of the target mobile terminal is within the preset distance range threshold;
   a receiving module, configured to receive a chat request sent by the target mobile terminal, the chat request including one or more user identifiers selected from the portion of the communications user list by the target mobile terminal; and
   an access module, configured to generate a group communication between the target mobile terminal and the mobile terminals whose associated user identifiers carried in the chat request have been marked as enabling group chat function.

10. The server according to claim 9, wherein the access module further comprises:
   a determining module, configured to determine whether there is an existing group communication between the target mobile terminal and at least a subset of the mobile terminals whose associated user identifiers carried in the chat request have been marked as enabling group chat function;
   a first access unit, configured to, when there is an existing group communication, add those mobile terminals that are not members of the existing group communication to the existing group communication; and
   a second access unit, configured to, when there is no existing group communication, creating a new group communication for the target mobile terminal and the mobile terminals whose associated user identifiers carried in the chat request have been marked as enabling group chat function.

11. The server according to claim 9, wherein the generating module is configured to generate the communications user list upon receipt of a request for enabling group chat function from the target mobile terminal.

12. The server according to claim 9, wherein the plurality of program modules further include:
   a one-to-one communication establishing module, configured to generate a one-to-one communication between the target mobile terminal and each mobile terminal whose associated user identifier carried in the chat request has been marked as enabling one-to-one chat function.

13. The server according to claim 9, wherein a first one of the current geographic locations of the plurality of mobile terminals and a last one of the current geographic locations of the plurality of mobile terminals are received within a predefined time window.

* * * * *